(12) United States Patent
Zimmermann

(10) Patent No.: US 11,975,471 B2
(45) Date of Patent: May 7, 2024

(54) DEVICE FOR GUIDING A FILM TUBE

(71) Applicant: Kdesign GmbH, Königswinter (DE)

(72) Inventor: Richard Zimmermann, Siegburg (DE)

(73) Assignee: Kdesign GmbH, Königswinter (DE)

( * ) Notice: Subject to any disclaimer, the term of this patent is extended or adjusted under 35 U.S.C. 154(b) by 227 days.

(21) Appl. No.: 17/596,057

(22) PCT Filed: Jun. 3, 2019

(86) PCT No.: PCT/EP2019/064386
§ 371 (c)(1),
(2) Date: Dec. 2, 2021

(87) PCT Pub. No.: WO2020/244737
PCT Pub. Date: Dec. 10, 2020

(65) Prior Publication Data
US 2022/0297368 A1    Sep. 22, 2022

(51) Int. Cl.
*B29C 48/355* (2019.01)
*B29C 48/00* (2019.01)
(Continued)

(52) U.S. Cl.
CPC ............ *B29C 48/355* (2019.02); *B29C 48/08* (2019.02); *B29C 48/885* (2019.02); *B29C 48/0018* (2019.02)

(58) Field of Classification Search
CPC ..... B29C 48/885; B29C 48/355; B29C 48/08; B29C 47/90; B29C 48/0018; B29C 48/10; B29C 48/907; B29C 55/28
See application file for complete search history.

(56) References Cited

U.S. PATENT DOCUMENTS 3,980,418 A    9/1976  Schott, Jr.
4,388,061 A *  6/1983  Bebok ................... B29C 48/903
                                              425/445
(Continued)

FOREIGN PATENT DOCUMENTS

DE    3828259    *  3/1990  ............. B29C 47/90
EP    1 714 770 A1    10/2006
(Continued)

OTHER PUBLICATIONS

International Search Report for PCT/EP2019/064386 dated, Feb. 11, 2020 (PCT/ISA/210).

*Primary Examiner* — James R Bidwell
(74) *Attorney, Agent, or Firm* — Sughrue Mion, PLLC

(57) ABSTRACT

A device for guiding a film tube emerging from a film blowing head and drawn off in a production direction, including a frame (48) through which the film tube (16) can be passed in the production direction (P), and a plurality of adjusting units (59, 60) distributed over the circumference for adjusting film guide elements (47) transversely to the production direction (P), the adjusting units (59, 60) each having: a pivot arm (50), pivotally attached to the frame (48), a carrier (51) for at least one of the film guide elements (47), the carrier (51) being pivotally connected to the pivot arm (50), and a coupling rod (52) pivotably connected to the carrier (51). At least one first adjusting unit (59) has an actuating mechanism (53, 54) through which the coupling rod (52) the adjusting unit (59) is connected in an articulating manner to the frame (48).

16 Claims, 10 Drawing Sheets

(51) Int. Cl.
 *B29C 48/08* (2019.01)
 *B29C 48/885* (2019.01)

(56) References Cited

U.S. PATENT DOCUMENTS

| | | | |
|---|---|---|---|
| 5,441,395 A | 8/1995 | Planeta | |
| 6,196,827 B1 | 3/2001 | Pottorff | |
| 9,724,867 B2 * | 8/2017 | Oberdalhoff | B29C 55/28 |
| 2004/0086587 A1 * | 5/2004 | Meyer | F16C 33/62 |
| | | | 425/72.1 |
| 2009/0304840 A1 | 12/2009 | Frische et al. | |

FOREIGN PATENT DOCUMENTS

| | | | |
|---|---|---|---|
| EP | 1 491 319 B1 | 1/2008 | |
| EP | 1 967 350 A2 | 9/2008 | |
| EP | 2 662 197 A1 | 11/2013 | |
| EP | 1 965 965 B1 | 1/2018 | |
| JP | 59-61916 U | 4/1984 | |
| WO | 2007/079899 | * 7/2007 | B29C 47/90 |
| WO | 2007/079899 A1 | 7/2007 | |
| WO | 2016/139573 A1 | 9/2016 | |

\* cited by examiner

DEVICE FOR GUIDING A FILM TUBE

CROSS REFERENCE TO RELATED APPLICATIONS

This application is a National Stage of International Application No. PCT/EP2019/064386 filed Jun. 3, 2019.

BACKGROUND OF THE INVENTION

Field of the Invention

The invention relates to a device for guiding a film tube emerging from a film blowing head and drawn off in a production direction, having a frame through which the film tube can be guided in the production direction, and a plurality of adjusting units arranged distributed over the circumference for adjusting film guide elements transversely to the production direction. The adjusting units each include a pivot arm pivotally attached to the frame, a carrier for at least one of the film guide elements pivotally connected to the pivot arm, and a coupling rod pivotally connected to the carrier.

Background

In the manufacturing process of a film tube, plastic melt is extruded from an extrusion die with a ring channel nozzle and drawn out. The plasticized, plastically formable and expandable hot film tube is blown on and cooled by cooling air from a cooling ring or an internal cooling device immediately after it emerges from the ring channel on the outer and often also on the inner circumference. The tubular film bubble is guided longitudinally over a device for guiding the film tube (often also referred to as a guiding device, calibration device or calibration basket) and a collapsing unit, and is squeezed off and drawn off as a flat tube from conveyor rollers in a draw-off unit. The so-called freezing of the film tube, i.e. the transition of the plastic melt of the film tube from a plasticized and expandable state to a state that can no longer be expanded, usually takes place just below the calibration device. The calibration device has film guide elements distributed over the circumference serving to guide the film tube. The film guide elements may, for example, have rollers that contact the film tube tangentially and guide it. The film guide elements are radially adjustable transversely to a production direction of the film tube and thus adaptable to different diameters of the film tube.

An apparatus of the type mentioned initially is known from EP 1 967 350 A2. The guide device described therein has a carrier structure to which a plurality of movable arms are pivotally attached. The arms carry guide means which are kept in contact with the film tube. The movable arms are formed of an articulated quadrilateral and each comprises a quadrilateral body pivotally attached to the carrier structure in a flap-like manner, a link rod pivotally attached to the carrier structure at one end, and a carrier member for the guide means pivotally attached to the other end of the link rod. The movable arms are arranged in such a way that the guide means are always held tangentially to the film tube. The movable arms, the link rods and the carrier elements are each attached to the carrier structure and to each other in such a way that they form a trapezoidal arrangement in the manner of a four-bar linkage.

Connecting means, which connect the link rod to the carrier element, describe an arc of a circle around that end of the link rod, which is rotatably attached to the carrier structure, during adjustment. With this arrangement, guide means in the form of horizontally arranged rotatable rollers are held tangentially to the film tube. However, the positioning of the rollers is only approximately centric to the film bubble.

Also known from the prior art are basically contacting and non-contacting calibration and guiding devices whose film guide elements are adapted to the respective diameter of the film tube by means of various types of adjusting units. In order to enable a stepless diameter adjustment, the film guide elements are divided into calibration segments on the circumference according to the state of the art. For diameter adjustment, pivot arm mechanisms with tangential pivoting of the film guide elements and lever or scissor mechanisms with radially centric adjustment of the film guide elements are essentially known.

Scissor mechanisms, such as those according to EP 1 714 770 B1 or EP 1 491 319 B1, allow a radially centric adjustment of the calibration segments. However, the indirect linear positioning movement is subject to a permanent change of the positioning speed at a constant drive speed, which leads to an increased control effort, especially in modern systems with automatic control of the diameter adjustment.

Furthermore, designs are known in which features of both systems are combined in order to enable a centric adjustment with a pivot arm principle via additional film guide elements that can be pivoted in, as shown for example in EP 1 967 350 B1, EP 1 965 965 B1, EP 2 662 197 B1, WO 2007/079899 A1 and WO 2016/139573 A1.

A calibration device with contactless film guide elements is shown in EP 2 801 467 B1. The Venturi or Bernoulli effect is used here, by which an air flow guided tangentially at sufficient speed along a surface of the guide element facing the tubular film exerts a suction and fixing force on a sufficiently close moving element, in this case the tubular film, without coming into contact. The tubular film takes up a stable distance position to the film guide element due to this force in conjunction with the air cushion as a counter-force. The film guide elements with contactless air cushion guiding can be single elements arranged parallel spaced in production direction, as well as pairs of elements crossed in height-shifted V-position, which are arranged parallel spaced in production direction.

All known designs feature mechanical synchronization of the calibration segments arranged on the circumference. The embodiments according to WO 2007/079899 A1 and WO 2016/139573 A1 have in common a direct coupling of the additionally pivotable film guide elements of the respective calibration segments. The coupling elements used for this are telescopic or foldable in one plane and rigid in another plane and ensure a common tangential and centric alignment of the film guide elements to the film tube via the adjustment path. The coupling elements have no connection to the outer rigid frame. Therefore, this embodiment is difficult to control in larger designs and tends to inaccuracy in the positioning of the film guide elements to the film tube and to jamming.

The object of the present invention is to provide an apparatus for guiding a film tube emerging from a film blowing head and withdrawn in a production direction, in which film guide elements are positioned as precisely as possible on the film tube when the diameter of the film tube is changed.

SUMMARY OF THE INVENTION

The problem is solved by a device for guiding a film tube emerging from a film blowing head and drawn off in a production direction, comprising a frame through which the film tube can be guided in the production direction, and several adjusting units distributed over the circumference for adjusting film guide elements transversely to the production direction, the adjusting units each having a pivot arm pivotably attached to the frame, a carrier for at least one of the film guide elements, the carrier being pivotably connected to the swivel arm, and a coupling rod pivotably connected to the carrier. Furthermore, at least one first adjusting unit of the plurality of adjusting units comprises an actuating mechanism by means of which the coupling rod of the at least one first adjusting unit is pivotally connected to the frame.

The diameter-adjustable device for guiding the film tube (calibration and guiding device) according to the invention enables precise centric adjustment of the film guide elements to the film tube for any diameter of the film tube with little constructional effort. This is done in particular by the actuating mechanism that is arranged between the coupling rod and the frame and connects the coupling rod to the frame in an articulating manner.

By arranging the actuating mechanism between the coupling rod and the frame, the adjustment of the film guide elements relative to the film tube can be specified more precisely than is possible in the prior art with only a trapezoidal arrangement of the adjusting unit.

In this case, the coupling rod executes translatory movements at the end connected to the carrier and at the end connected to the actuating mechanism, which are not congruent or have non-congruent movement vectors.

The coupling rods can be simple rods with a round, square or rectangular cross-section. However, they can also be made more complex, for example as milled parts, turned parts, stamped parts, metal castings, metal pressed parts, injection molded parts, laser-cut sheet metal parts or sheet metal edged parts.

The at least one first adjusting unit may form an unequal ratio transmission gear, namely a coupling gear or a cam gear. These two gear types offer the most options in structures and features to ensure precise alignment of the film guide elements with respect to the film tube.

In an exemplary embodiment, the at least one first adjusting unit may form a six-bar linkage. The complexity of the gearbox design is relatively low, while a high precision of the motion sequences and adaptability to different framework conditions is made possible. In particular, the coupling gear can be designed as a Stephenson chain.

The actuating mechanism may be coupled to three elements, namely to the pivot arm of the at least one first adjusting unit, to the coupling rod of the at least one first adjusting unit and to the frame.

The actuating mechanism may comprise a coupling element which is articulated connected, on the one hand, to the coupling rod of the at least one first adjusting unit and, on the other hand, to the frame, respectively. "Articulated" in this context means that the coupling element is respectively connected to the coupling rod and the frame by means of a revolute joint for a pivoting connection, by means of a rectilinear joint for a sliding connection, or by a combination of both.

In an exemplary embodiment, the coupling element is pivotally connected to the coupling rod of the at least one first adjusting unit.

The actuating mechanism may further comprise a connecting lever pivotally connected, on the one hand, to the pivot arm of the at least one first adjusting unit and, on the other hand, to the coupling element of the at least one first adjusting unit. Alternatively, it is also possible for the connecting lever to be pivotally connected to the coupling rod instead of to the coupling element.

In this case, the pivot arm comprises all components which are rigidly connected to one another and which are moved or pivoted uniformly, in particular a pivot plate arranged outside a pivot axis about which the pivot arm is pivotably attached to the frame, for connection to a drive.

In a further exemplary embodiment, the coupling element may be slidably connected to the coupling rod of the at least one first adjusting unit on the one hand and pivotably connected to the frame on the other hand.

Here, the actuating mechanism may comprise a cam guide mechanism having a guide and a cam follower, wherein the coupling rod is coupled to the frame or the pivot arm via the cam guide mechanism, and wherein the cam follower is guided along the guide so as to be movable translationally.

The cam follower may be located on one element of the group comprising the coupling rod and the frame, and the guide may be located on the other element of the group comprising the coupling rod and the frame. Alternatively, the cam follower may be arranged on one element of the group comprising the coupling rod and the pivot arm and the guide may be arranged on the other element of the group comprising the coupling rod and the pivot arm.

In an exemplary embodiment, the cam follower may be connected to the coupling rod and the guide may be arranged on the frame. The cam follower can be firmly connected to the coupling rod or be designed as a sliding element that is pivotably or rotatably connected to the coupling rod. The cam follower can be a simple bolt, a fitting screw or even a rolling element such as a ball bearing or a sleeve with a rotating bearing. Of course, in a more complex design of the coupling rod, the cam follower may also be incorporated into the coupling rod.

In this case, the guide can be a curved track, for example a cam plate or a curved groove.

For instance, the guide, for example in the form of a cam plate, may be mounted indirectly or directly on the rigid frame. The cam plate can also be part of the rigid frame, i.e. the track is directly incorporated into the rigid frame.

However, it may also be provided that the guide or cam plate is attached to or forms part of the respective pivot arm of one of the adjusting units, i.e. the track is incorporated directly into the pivot arm.

As explained above, the pivot arm also includes a pivot plate located outside the pivot axis for driving the pivot arm. It is conceivable that the track is incorporated directly into the pivot plate and that the pivot plate serves as a cam plate.

The coupling element may be part of a rectilinear joint that is rotatably mounted directly or indirectly to the rigid frame. A front end of the coupling rod is connected directly or indirectly to the pivotable carriers for the film guide elements, and a rear end of the coupling rod is guided displaceably on the rectilinear joint.

Upstream or downstream of the rectilinear joint, the coupling rod may have a cam follower that engages and is positively guided in the track of the associated guide or cam plate.

The aforementioned designs can all also be reversed in their arrangement in such a way that a cam plate is fitted to the coupling rod in front of or behind the rectilinear joint instead of the cam follower. In a more complex design of the coupling rod, the cam plate can also be part of the coupling rod, i.e. the track is directly incorporated into the coupling rod.

The cam follower, which engages in the track of the cam plate, is then mounted or incorporated on the rigid frame or on the respective pivot arm of the adjusting unit.

When the diameter of the calibration and guiding device is adjusted via the pivot arms of the adjusting unit, the angle between the pivot arms and the associated coupling rods changes. As a result, the cam follower moves within the track of the cam plate, or in the case of a reversed arrangement, the track of the cam plate moves along the cam follower, so that exactly the displacement of the coupling rod in the axial direction necessary for the approached diameter is produced for an exactly centric alignment of the film guide elements to the film tube. The distance from the front end of the coupling rod to the rotatable rectilinear joint changes over the adjustment path. The front end is the end of the coupling rod that is connected to the carrier.

The shape of the track is designed in such a way that for any given diameter of the calibration and guiding device, exactly the right pivot angle is set for the carriers of the film guide elements.

The apparatus may further include a synchronization mechanism by which the adjusting units are coupled together to synchronize the adjustment movements.

In this case, the synchronization mechanism may have push rods by means of which the adjusting units are coupled to one another circumferentially over the circumference of the device.

It may be provided that at least one second adjusting unit of the plurality of adjusting units comprises a coupling element which is articulated connected, on the one hand, to the coupling rod of the at least one second adjusting unit and, on the other hand, to the frame and, moreover, is free from direct coupling to the respective adjustment arm. Here, the synchronization mechanism may include push rods by which the coupling elements are coupled together circumferentially about the circumference of the device.

In one embodiment, the pivot arms hinged to the rigid frame are circumferentially coupled to each other for a synchronous pivoting action. The coupled pivot arms are moved by a common actuator, which has a linear or rotary actuator. The rotating coupling is preferably formed by a simple and robust push rod system. However, other circumferential couplings such as a chain or toothed belt drive are also conceivable. The circumferential coupling system of the pivot arms, together with the drive or the actuator, forms a first movable actuating system and realizes the diameter adjustment of the calibration and guiding device. A second movable actuating system is used for diameter-dependent pivoting of the carriers for the film guide elements. The carriers are attached to the free end of the pivot arms and are mounted to rotate about a pivot axis parallel to the production direction.

In a modified form, the coupling of the first and second movable actuating systems by means of the actuating mechanism takes place only at one of the pivot arms and, in addition, the coupling rods are coupled to each other in a circumferential manner, for example by means of push rods, in a mechanically synchronous manner. Of course, other combinations are also conceivable, for example coupling by means of an actuating mechanism at every second or third of the pivot arms with synchronous mechanical coupling of the intermediate coupling rods to each other.

In an exemplary embodiment, the actuator concept is also reversible in that the linear or rotary actuator is part of the second movable actuating system. However, if the positioning speed of the positioning actuator is constant, the resulting adjustment speed of the diameter is not constant. If a constant adjustment speed is required, for example in systems with diameter adjustment of the calibration and guiding device automated in control loops, the adjustment speed of the actuator must be varied depending on the diameter.

The film guide elements can have single elements arranged parallel spaced in the production direction, as well as pairs of elements crossed in a height-shifted manner in V-position, which are arranged parallel spaced in the production direction.

The film guide elements attached to the carriers may be, for example, supported rollers with different thermally insulating or anti-adhesive sheaths or coatings. It may also be provided that the entire roller sheath is made of a thermally insulating material, for example carbon fiber. The film guide elements can also be rigid rods with a sliding coating (straight or slightly curved towards the film tube). The film guide elements can also be rigid round rods on which several short ring-shaped bodies made of a heat-insulating material are rotatably lined. For contact-free, absolutely mark-free film guidance, the film guide elements can be rigid beams (straight or slightly curved towards the film bubble), which form an air cushion that guides the film tube without direct contact.

In one embodiment, the carriers each have two, for instance elongated, film guide elements, for example in the form of rollers or air bars, which are spaced apart from one another in the production direction and are arranged to overlap in a V-shape. When using rollers or similar contacting film guide elements as described above, they are held in contact with the film tube. When air bars are used, they are held so close to the film tube that they can hold the film tube by the Venturi or Bernoulli effect. Since the two film guide elements arranged in a V-shape relative to each other are moved simultaneously by one of the adjusting units, a particularly precise centric alignment of the film guide elements relative to the film tube is required so that both film guide elements are held evenly in contact with the film tube or close to it.

In all of the previously described embodiments, the pivot arms may be designed in an exemplary form as cut-to-size shaped plates with stabilizing upstands. Depending on the load, a cross-sectional height decreasing towards the front of the carrier of the film guide elements is selected.

In any of the previously described embodiments, cooling gas exhaust elements may be mounted between, below, or above film guide elements, which are disposed on the adjusting units. These cooling gas exhaust elements are preferably tubular with a round or angular cross-section or in the form of a sheet metal housing construction and preferably have on their inner contour and/or underside one or more openings for withdrawing by suction cooling gas which flows from the cooling process in the production direction along the film tube and is loaded with oily or waxy monomers which outgas from the hot melt.

The inner contour of the cooling gas exhaust elements can be straight or slightly curved towards the tubular film, whereby the radius of curvature corresponds approximately to the largest radius of the tubular film. This curvature can also be approximated by several straight line segments and corresponding bend angles. The cooling gas exhaust elements are preferably attached to the pivotable carrier in the same way as the film guide elements and are moved together with the film guide elements relative to the tubular film bubble when the diameter of the calibration and guide device is adjusted. This ensures that the cooling gas exhaust elements function effectively for all diameters.

The extracted cooling gas takes place via hose and pipe lines by means of a central exhaust fan. A partial or complete extraction of the loaded cooling gas above the frost line in the area of the calibration and guiding device prevents or reduces contamination of the downstream machine components by deposits of monomers.

In order to keep the calibration device itself clean, the cooling gas exhaust elements are arranged in the lower area of the calibration and guiding device. Corresponding devices for the extraction of cooling gas are known in the prior art (for example according to EP 1 491 319 B1).

SUMMARY OF THE INVENTION

Examples of embodiments of devices for guiding a film tube emerging from a film blowing head and withdrawn in a production direction are explained in more detail below with reference to the figures. Herein FIG. 1 is a general view of a blown film line;

DETAILED DESCRIPTION OF THE INVENTION

Figure 1:
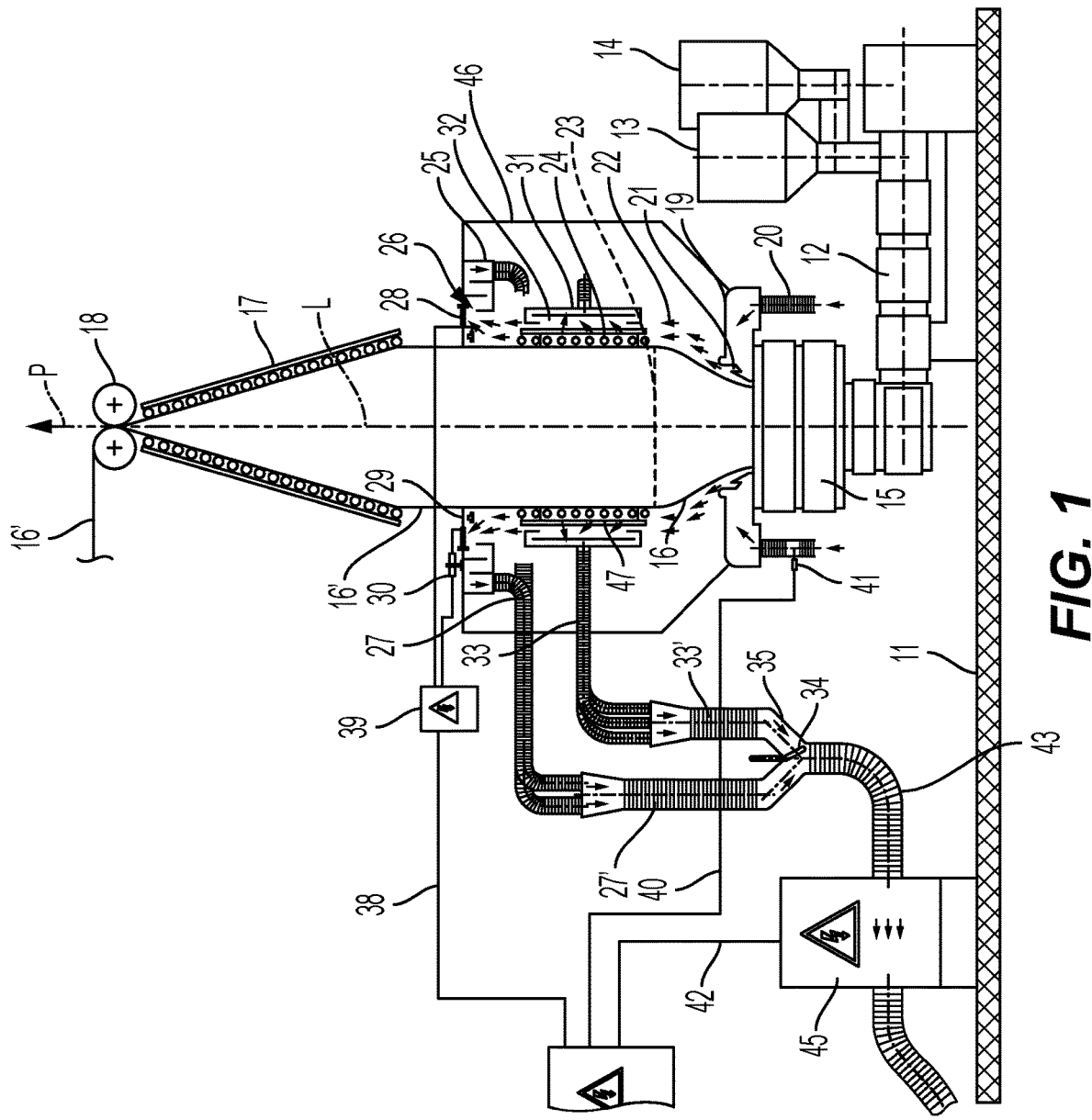

FIG. 1 shows a side view and a partial longitudinal section through a longitudinal axis of a blown film tube of a blown film line for the production of the film tube. An extruder 12 stands on a machine foundation 11, on which two feed hoppers 13, 14 for thermoplastic material can be seen. Thermoplastic material fed in granular form via the feed hoppers 13, 14 is plasticized and homogenized by pressure and additional heating means in a screw of the extruder 12 and pressed into a blow head 15, adjoining the extruder, with vertical axis. The blow head 15 has on an upper side an annular nozzle, not shown in detail, from which an expanding axisymmetric film tube 16 of initially still plasticized film material emerges. After solidification of the film material, the film tube 16' substantially retains its diameter. The film tube 16' is pressed flat in a collapsing unit 17 and pulled off upwards by a take-off unit 18. The flattened film tube 16" is then wound onto coils. In the direction from the blow head 15 to the take-off unit 18, the functional terms "in front of" and "downstream of" are used in such a way that they mean "below" and "above" in spatial relationship.

A cooling gas ring 19 with a plurality of cooling gas supply lines 20 is shown immediately above the blow head 15. The cooling gas ring 19 has inner outlet nozzles 21 from which the cooling gas flows out and annularly flows substantially parallel to the wall against the film tube 16, which is under increased internal pressure. The cooling gas flow is symbolized by arrows 22. The film tube 16 plasticized in this area initially expands in diameter under the aforementioned excess pressure inside until it hardens under the action of the cooling gas and assumes constant diameter. The point of transition from the plasticized material to the hardened material is called the "frost line" and is designated 23.

Above, i.e. downstream from the frost line 23 in the draw-off direction, is a calibration and guiding device 24 which includes film guide elements 47 having superimposed roller arrangements which are substantially annular around the film tube 16'. In order to enable adaptation to film tubes of different diameters, the roller arrangements are generally located on individual pivotable segments forming partial circumferences, by means of which the diameter of the calibration device can be changed. In cross-section, these segments can form a simplified polygon-shaped calibration device. The still relatively warm film tube 16' is stabilized in cross-section by the calibration and guiding device 24 and centered with respect to the entry into the collapsing unit 17. The calibration and guiding device 24 may be arranged in a height-adjustable manner relative to the blow head 15, in order to always be able to assume an optimum height position relative to the frost line.

Downstream of the calibration and guiding device 24 there is a gas exhaust ring 25 with inner exhaust ring nozzles 26, which can suck off the cooling gas contaminated with evaporations from the film tube. Circumferentially distributed exhaust lines 27 are connected to the gas exhaust ring 25. The cooling gas loaded with evaporations is symbolized by arrows 28. Immediately downstream of and mechanically connected to the gas exhaust ring 25 is an adjustable orifice plate 29, which sealingly encloses the film tube 16'. The orifice plate 29 is adjustable in its opening cross-section by means of an adjustment device 30, and is thus adaptable to different diameters of the film tube 16'. By sealing the film tube above the gas exhaust ring 25, clean air is prevented from being drawn in from an area downstream of the gas exhaust ring, so that the extraction of the loaded cooling gas is optimized with low energy input.

In the region of the calibration and guiding device 24, there is alternatively or additionally located radially outside the calibration and guiding device a further gas exhaust ring or a plurality of individual gas exhaust funnels or, as shown for example, gas exhaust beams 31 connected to a plurality of exhaust lines 33 distributed around the circumference. In this case, at least one gas exhaust beam or several gas exhaust beams arranged one above the other can be assigned to one of the aforementioned segments of the calibration device, so that an adaptation of the calibration device to different diameters of the film tube 16' can at the same time be accompanied by an adaptation of the additional extraction device to the different diameters. The plurality of exhaust lines 27 are initially combined into one line 27'. Similarly, the plurality of exhaust lines 33 are combined into a single line 33'. The lines 27' and 33' are then combined into a single gas exhaust line 43, with a control valve 34 disposed in the region of a pipe 35. In embodiments without the upper gas exhaust ring 25, the junction and control valve 34 are omitted, and the line 33' merges directly into the gas exhaust line 43. A exhaust fan 44 is connected to the exhaust line 43. A filter, for example an electrostatic precipitator 45, can be integrated in the exhaust line 43 before or after the exhaust fan 44 if it is impossible to blow off the exhaust gases into the environment outside a production hall for environmental protection reasons. Instead of the electrostatic precipitator 45, a condensate separator may also be provided which separates the contaminating evaporations of the film tube contained therein by flow mechanics and/or by cooling the exhaust gases.

A control unit 36 with processor controls the exhaust fan 44 via a control line 37, and another control unit 39 for controlling the adjustment device 30 for the orifice plate 29 via a control line 38. Signals from a cooling gas flow sensor 41 in the cooling gas supply lines 20 are transmitted to the control unit 36 via a measuring line 40. Signals of the pressure or flow conditions at the electrostatic precipitator 45 are transmitted to the control unit 36 via a measuring line 42. The control unit 36 may also control the cooling gas fan, which is also not shown, in a processor-controlled manner via another control line not shown here. The entire area from the first cooling gas ring 19 to the gas exhaust ring 25 is enclosed by an enclosure 46, so that the cooling gas contaminated with evaporations is kept away from the workplace of the operating personnel. Lines 27, 33 are passed through the enclosure in a sealed manner.

Figure 2:
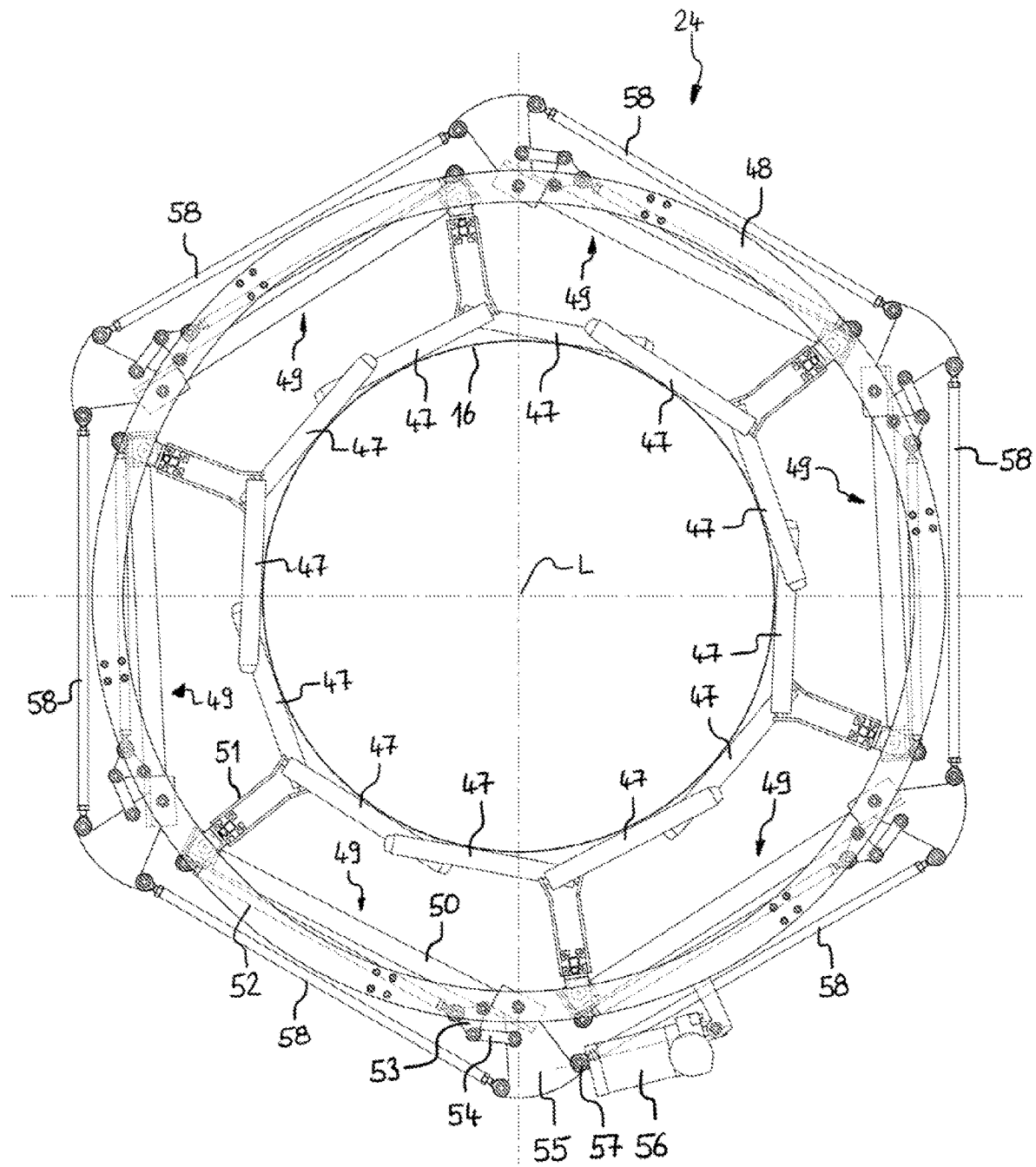
FIG. 2 is a top view of a first embodiment of a calibration and guidance device.

FIG. 2 shows a top view of a first embodiment of a device for guiding a film tube 16 emerging from a film blowing head and drawn off in a production direction (calibration and guiding device 24). The calibration and guiding device 24 has a frame 48 to which the movable elements described below are attached and which, if necessary, is arranged to be adjustable in height relative to the blow head. The frame 48 forms a central passage through which the film tube 16 is guided parallel to the longitudinal axis L or in the production direction P as shown in FIG. 1. There are 6 adjusting units 49 distributed around the circumference. The adjusting units 49 are used to adjust film guide elements 47 in a direction radial to the longitudinal axis L.

The adjusting units 49 each include a pivot arm 50 pivotally attached to the frame 48. In this case, the pivot arm 50 is pivotable about a pivot axis which is arranged parallel to the longitudinal axis L.

Furthermore, the adjusting units 49 each have a carrier 51 which, in the shown embodiment, carries two film guide elements 47 in the form of rollers which are spaced apart from each other in the production direction and are arranged to overlap in a V-shape. The carrier 51 is pivotally connected to the pivot arm 50. In this case, the carrier 51 is pivotally connected to the pivot arm 50 about a pivot axis which is arranged parallel to the longitudinal axis L.

Further, the adjusting units 49 each include a coupling rod 52 pivotally connected to the carrier 51.

Finally, the adjusting units 49 each comprise an actuating mechanism by means of which the coupling rod 52 is pivotally connected to the frame 48. In the embodiment shown in FIG. 2, the actuating mechanism comprises a coupling element 53 and a connecting lever 54. The coupling element 53 is hinged to the frame 48, to the coupling rod 52 and to the connecting lever 54. In the embodiment shown, the coupling element 53 is pivotally connected to each of the frame 48, the coupling rod 52 and the connecting lever 54.

The connecting lever 54 is also pivotally connected to the pivot arm 50. In the embodiment shown, the pivot arm 50 is fixedly connected to a pivot plate 55 which is disposed on a side of the pivot axis facing away from the carrier 51, the pivot arm 50 being attached to the frame 48 pivotally about said pivot axis. The connecting lever 54 is directly pivotally connected to the pivot plate 55. The connecting lever 54 is thus pivotally connected to the pivot arm 50 via the pivot plate 55.

Figure 3:
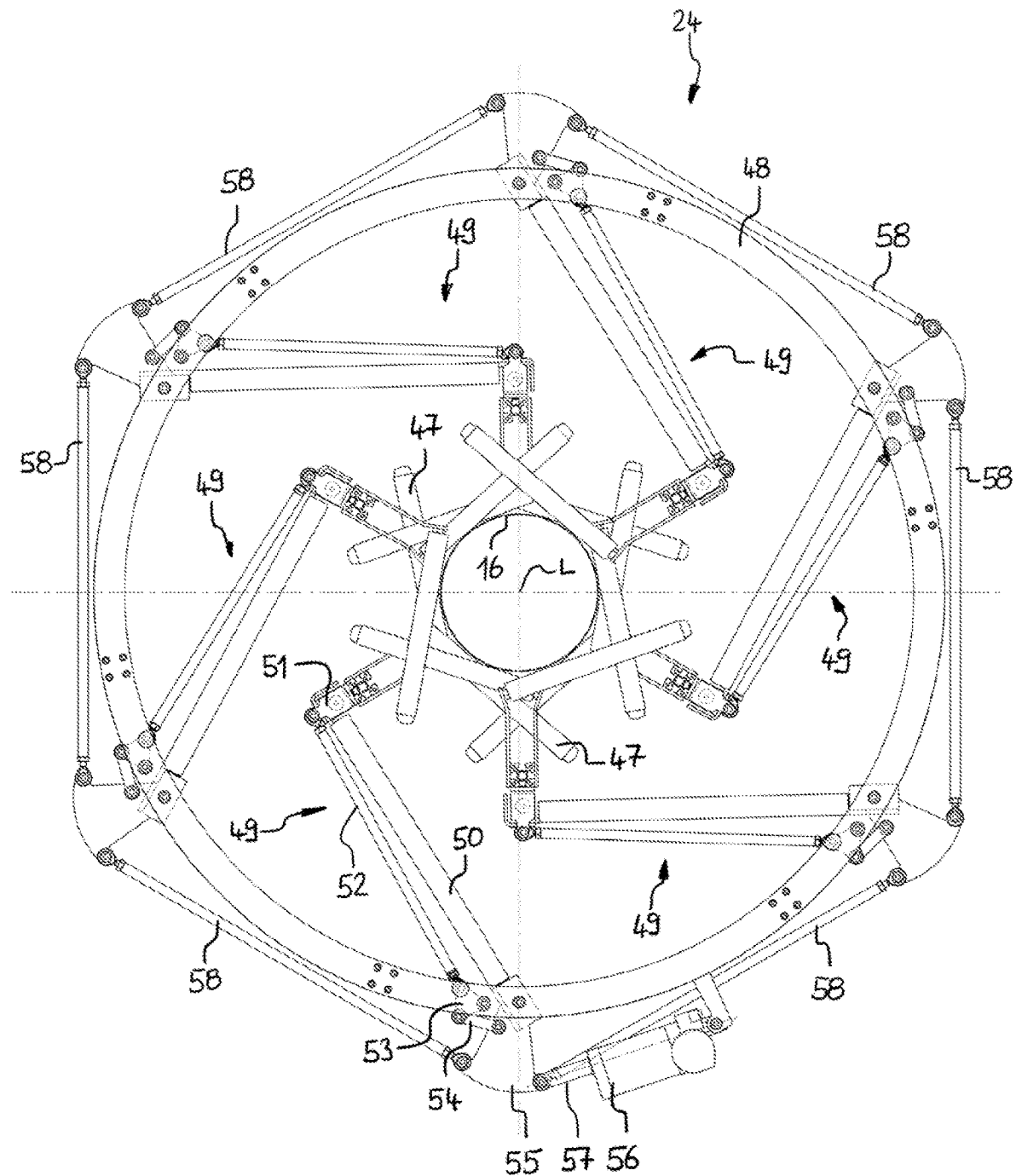
FIG. 3 is a top view of the calibration and guiding device according to FIG. 2, whereby the film tube has a smaller diameter compared to the illustration according to FIG. 2.

A drive 56 is also attached to the frame 48. The drive 56 is in the form of a solenoid, by means of which an actuator 57 in the form of a piston rod can be driven linearly. Here, the actuator 57 is pivotally connected to the pivot plate 55 of one of the adjusting units 49. Further, a housing of the drive 56 is pivotally connected to the frame 48. The drive 56 is thus supported against the frame 48, and the pivot arm 50 can be pivoted by adjusting the actuator 57. When the actuator 57 is moved from the retracted position shown in FIG. 2 to the extended position shown in FIG. 3, the pivot arm 50, which is connected to the drive 56, is pivoted inward so that the film guide elements 47 enclose a smaller diameter and can thus guide a smaller diameter film tube 16.

The calibration and guidance device 24 includes a synchronization mechanism to synchronize the movement of all adjusting units 49. The synchronization mechanism includes push rods 58, each of which couples the pivot plate 55 together about the circumference of adjacent adjusting units 49. For this purpose, the push rods 58 are each pivotally connected to the two pivot plates 55 of adjacent adjusting units 49. Thus, the pivoting movement of that adjusting unit 49 which is connected to the drive 56 via the pivot plate 55 is transmitted to the other adjusting units 49 which are not directly connected to the drive 56, so that all adjusting units 49 are moved synchronously.

Figure 4:
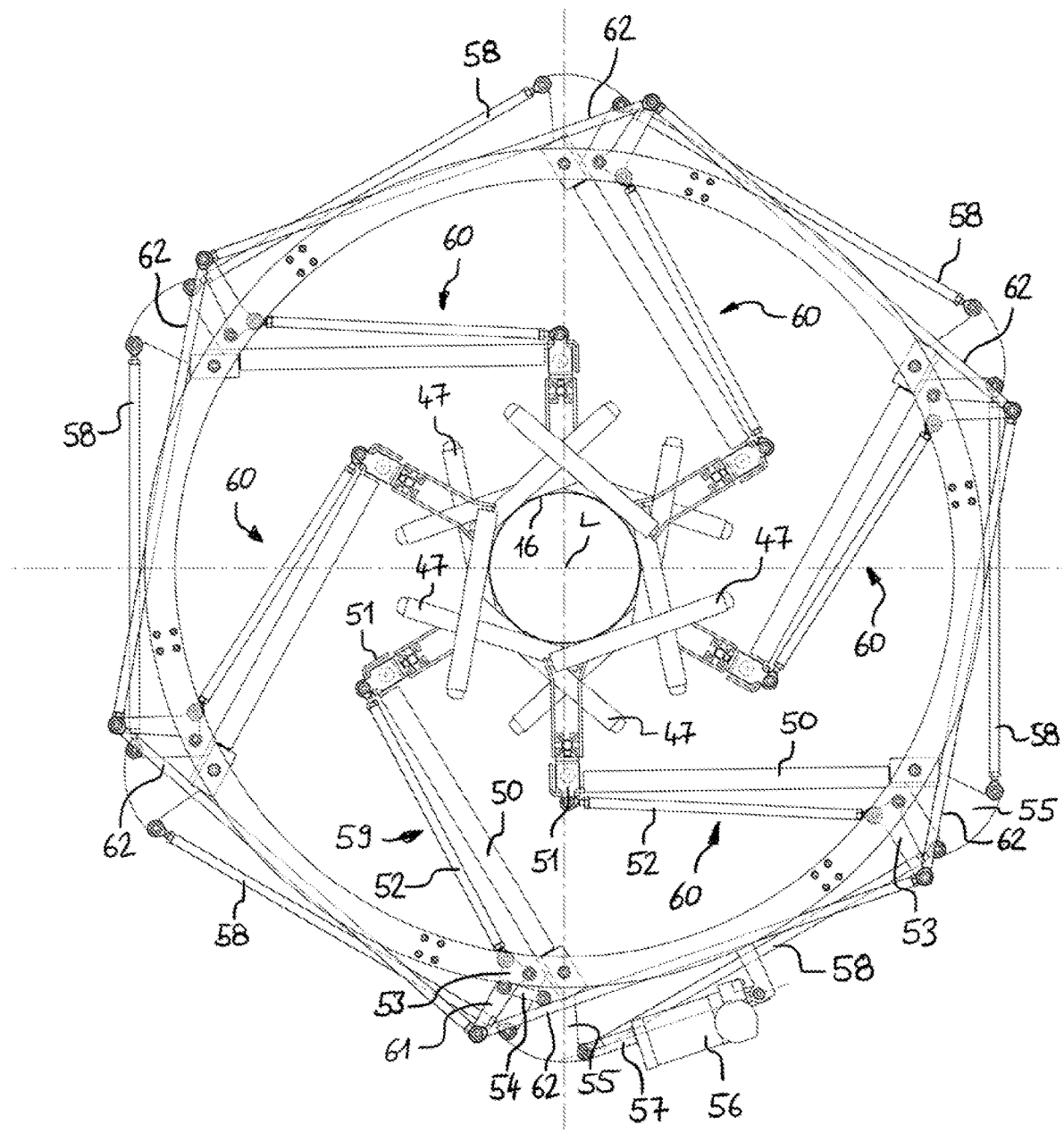
FIG. 4 is a top view of a second embodiment of a calibration and guidance device.

FIG. 4 shows a second embodiment of a calibration and guiding device 24, wherein components which correspond to components of the first embodiment are provided with the same reference signs and are described there.

The calibration and guidance device 24 according to the second embodiment comprises a first adjusting unit 59 and five second adjusting units 60. The first adjusting unit 59 is identical in terms of its function and kinematics to the adjusting units of the calibration and guiding device according to the first embodiment. In contrast, the coupling element 53 has a lever arm 61 which is located on a side facing away from the coupling rod 52 with respect to a pivot axis between the coupling element 53 and the connecting lever 54. In this case, the lever arm 61 is an integral part of the coupling element 53.

The coupling elements 53 of the second adjusting units 60 are formed similarly to the coupling element 53 of the first adjusting unit 59. Unlike the first adjusting unit 59, the second adjusting units 60 do not include a connecting lever 54.

A first synchronization mechanism is provided to synchronize the movement of the pivot arms 50, which is identical to the synchronization mechanism of the first embodiment of the calibration and guidance device. Furthermore, a second synchronization mechanism is provided comprising push rods 62 by means of which the coupling elements 53 of two circumferentially adjacent adjusting units 59, 60 are coupled to each other. All adjusting units 59, 60 are coupled to each other in pairs around the circumference so that the pivoting movement of the coupling element 53 of the first adjusting unit 59 is synchronously transmitted to all second adjusting units 60.

Figure 5:
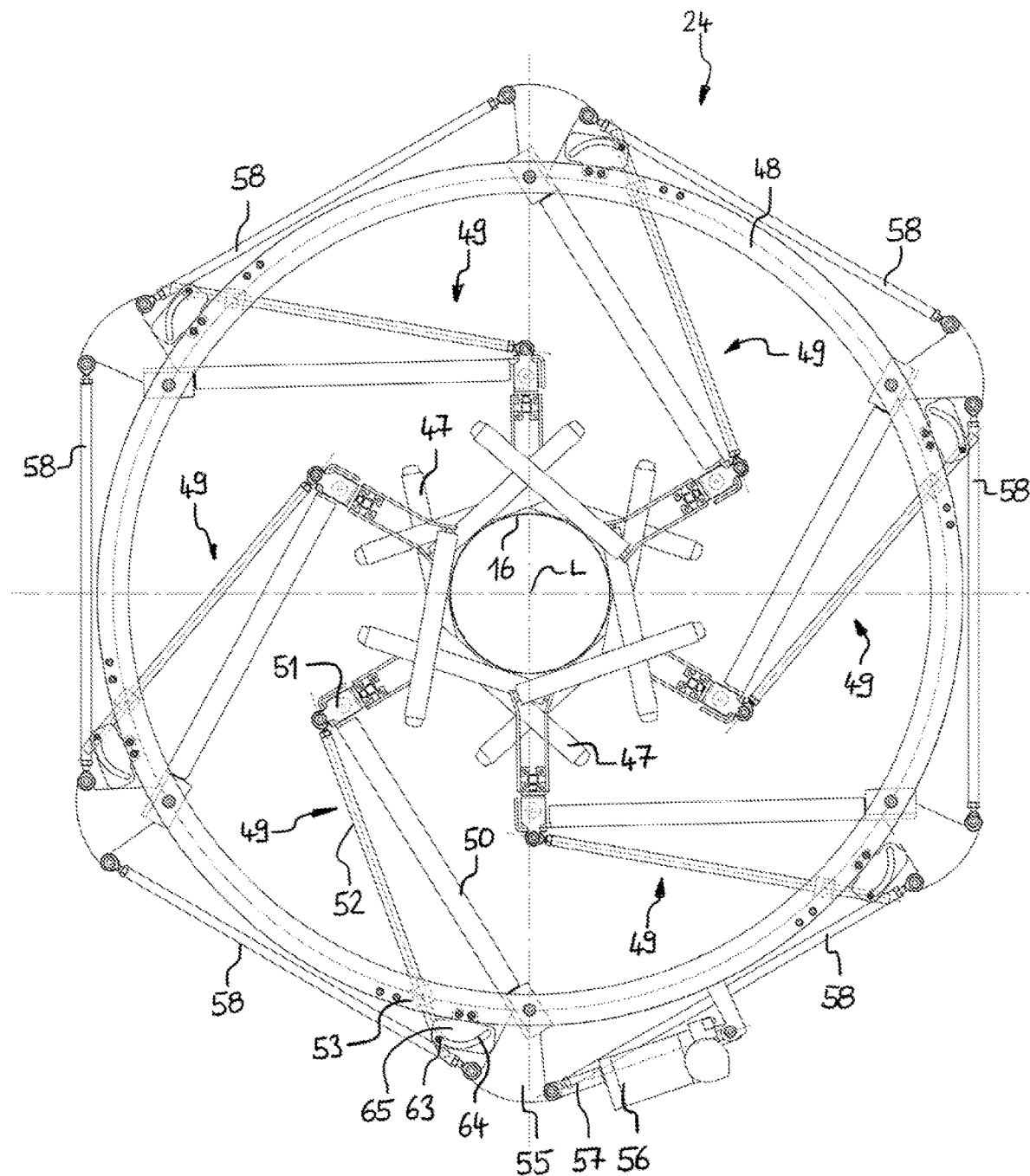
FIG. 5 is a top view of a third embodiment of a calibration and guidance device.

FIG. 5 shows a third embodiment of a calibration and guiding device 24, wherein components which correspond to components of the first embodiment are provided with the same reference signs and are described there.

In contrast to the first embodiment, the coupling rod 52 of the adjusting units 49 are each rotatably and slidably connected to the frame 48 via the coupling element 53. The coupling element 53 is rotatably connected to the frame 48. The coupling rod 52 is slidably coupled to the coupling element 53.

In addition, a cam follower 63 is attached to each of the coupling rods 52 and is guided along a guide 64 on the frame 48 for translational movement. In the embodiment shown, the guide 64 is a groove in a plate 65 that is fixedly attached to the frame 48. However, other guidance systems are also conceivable. The guide 64 is curvilinear in shape and adapted such that the carrier 51 is always aligned centrally with respect to the longitudinal axis L, irrespective of the distance from the longitudinal axis L or the film tube 16. This ensures precise centric alignment of the film guide elements 47 in the form of the two rollers relative to the film tube 16, so that both rollers are always held in contact with the film tube 16.

The coupling element 53, the cam follower 63 and the guide 64 together form the actuating mechanism by which the coupling rod 52 is connected to the frame 48.

In the third embodiment shown in FIG. 5, the cam follower 63 is located on the coupling rod 52 and the guide 64 is located on the frame 48. This arrangement may also be provided in reverse, i.e. the cam follower 63 may be attached to the frame 48 and the guide 64 may be attached to the coupling rod 52.

Figure 6:
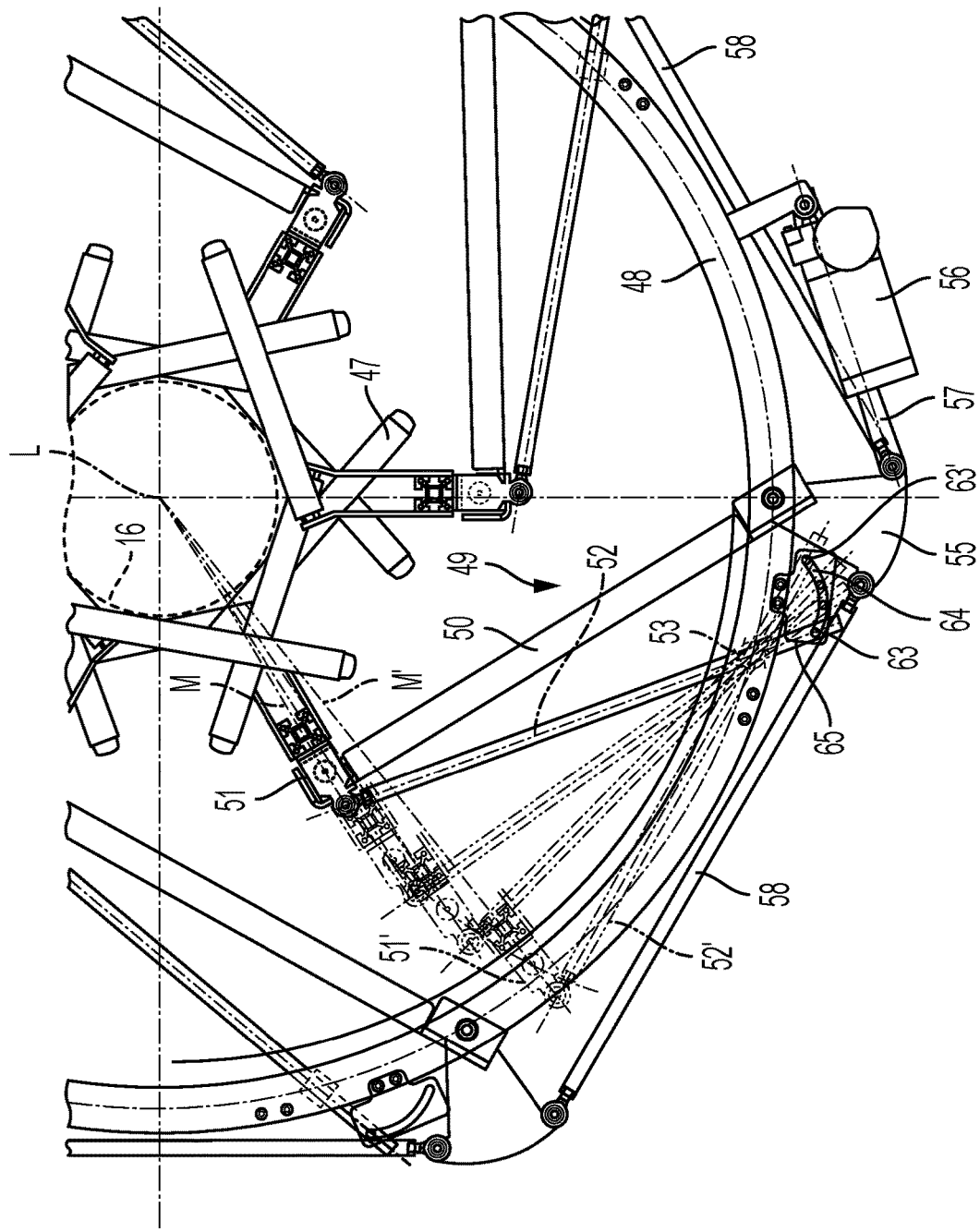
FIG. 6 is a partial plan view of the calibration and guiding device according to FIG. 5 in the area of one of the adjusting units, whereby the carrier and the coupling rod of the adjusting unit are shown in different pivot positions.

FIG. 6 shows a partial plan view of the calibration and guiding device of the third embodiment according to FIG. 5 in the area of one of the adjusting units 49, whereby the carrier 51 and the coupling rod 52 of the adjusting unit 49 are shown in different pivot positions. In a maximum inward pivoted position, in which a smallest diameter is released for the film tube 16, the components are shown with solid lines. In pivot positions deviating from the maximum inward pivot position, the components are shown with dashed lines.

In a plane transverse to the longitudinal axis L, the carrier 51 forms a central axis M which passes through or intersects the central axis of the tubular film or the longitudinal axis L, independently of the pivot position of the adjusting unit 49. In the embodiment shown, the central axis M is arranged to extend along a pivot axis about which the carrier 51 is pivotally connected to the pivot arm 50 and another pivot axis about which the coupling rod 52 is pivotally connected to the carrier 51. It can be seen in FIG. 6 that, irrespective of the pivot position, the central axis M, M' always passes through the longitudinal axis L, whereby in the maximum outwardly pivoted pivot position the carrier is provided with the reference sign 51' and the central axis with the reference sign M'.

Furthermore, it can be seen how the cam follower 63 is guided within the guide 64. In the maximum inward pivoted position, the cam follower is provided with the reference sign 63 and in the maximum outward pivoted position, the cam follower is provided with the reference sign 63'.

Furthermore, the distance between the coupling element 53 and the cam follower 63, which changes over the pivot position, can be seen. This is due to the fact that when the pivot arm 50 is pivoted from the maximum inwardly pivoted pivot position to the maximum outwardly pivoted pivot position, the coupling rod 52 is pushed outwardly through the coupling element 53. Therefore, the distance between the coupling element 53 and the cam follower 63 in the maximum inwardly pivoted pivot position is less than in the maximum outwardly pivoted pivot position of the pivot arm 50.

Figure 7:
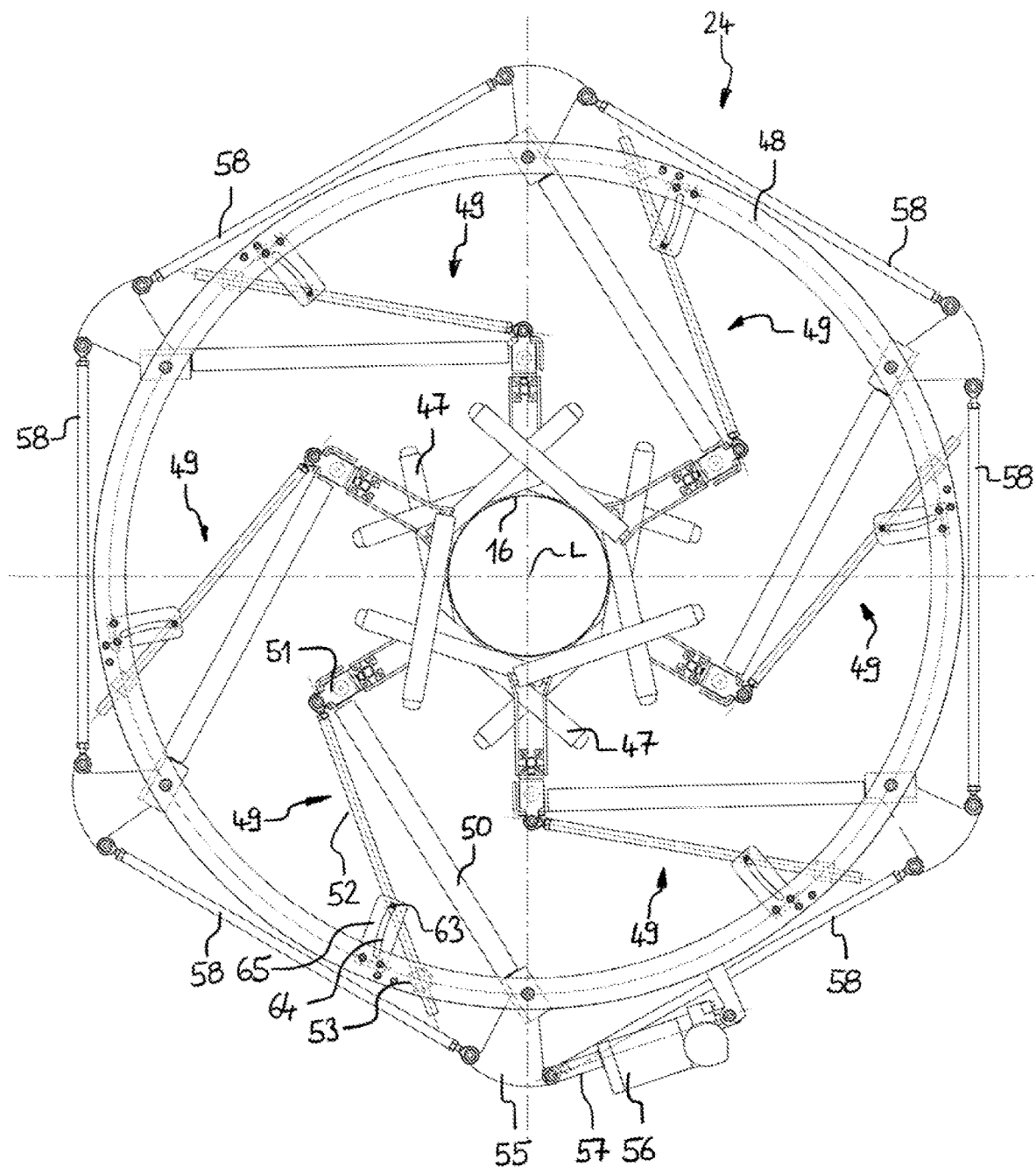
FIG. 7 is a top view of a fourth embodiment of a calibration and guidance device.

In the third embodiment, the cam follower 63 is located on a side of the coupling element 53 facing away from the carrier 51. However, as in the fourth embodiment shown in FIG. 7, the cam follower may also be arranged on the same side of the coupling element 53 as the carrier 51. In addition, the plate 65 with the guide 64 projects inwardly from the frame 48, rather than outwardly as in the third embodiment shown in FIG. 5. In all other respects, the fourth embodiment shown in FIG. 7 corresponds to the third embodiment shown in FIG. 5.

Figure 8:
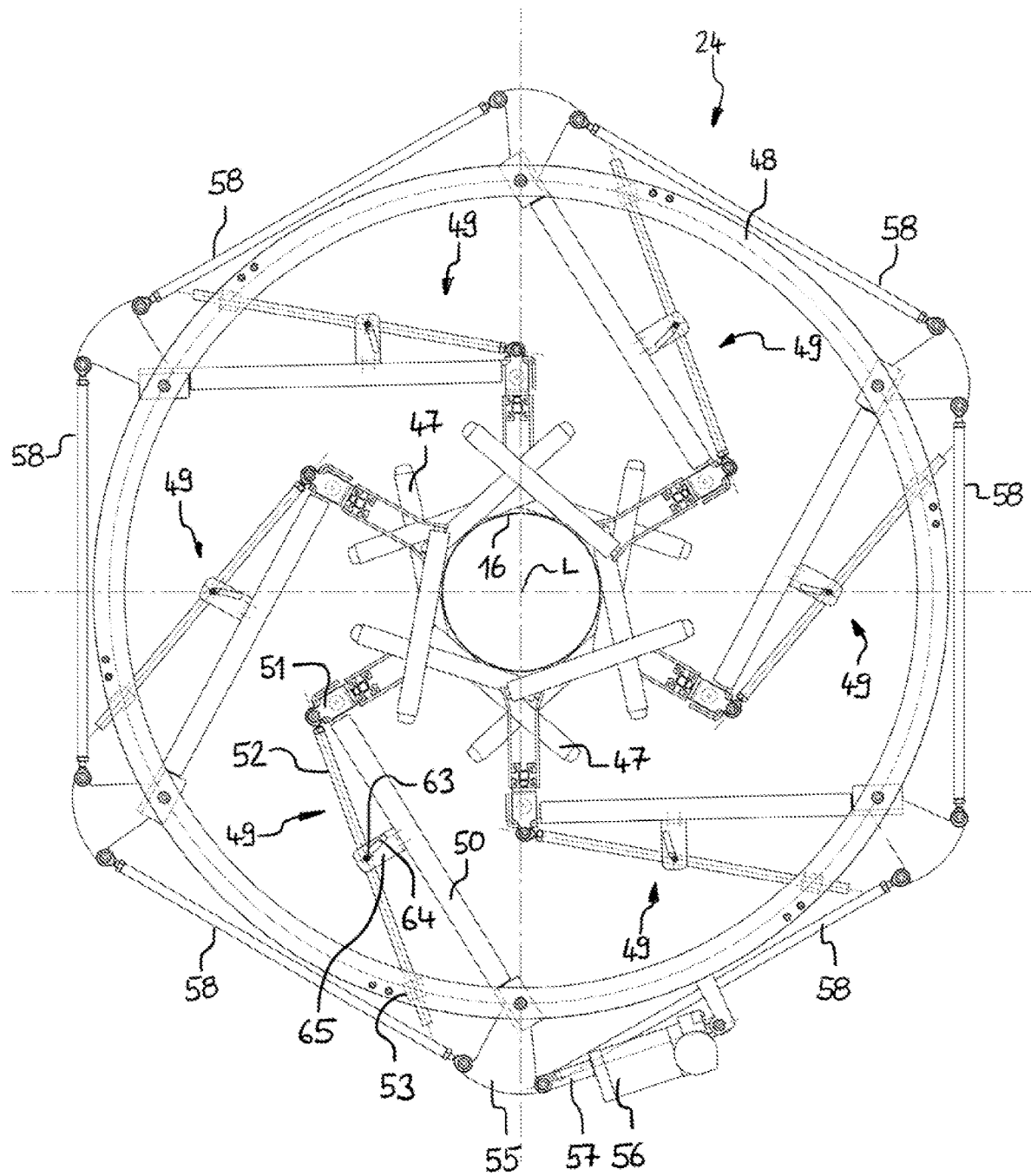
FIG. 8 is a top view of a fifth embodiment of a calibration and guidance device.

FIG. 8 shows a fifth embodiment of a calibration and guiding device 24, wherein components which correspond to components of the third embodiment according to FIG. 5 are provided with the same reference signs and are described there.

Figure 9:
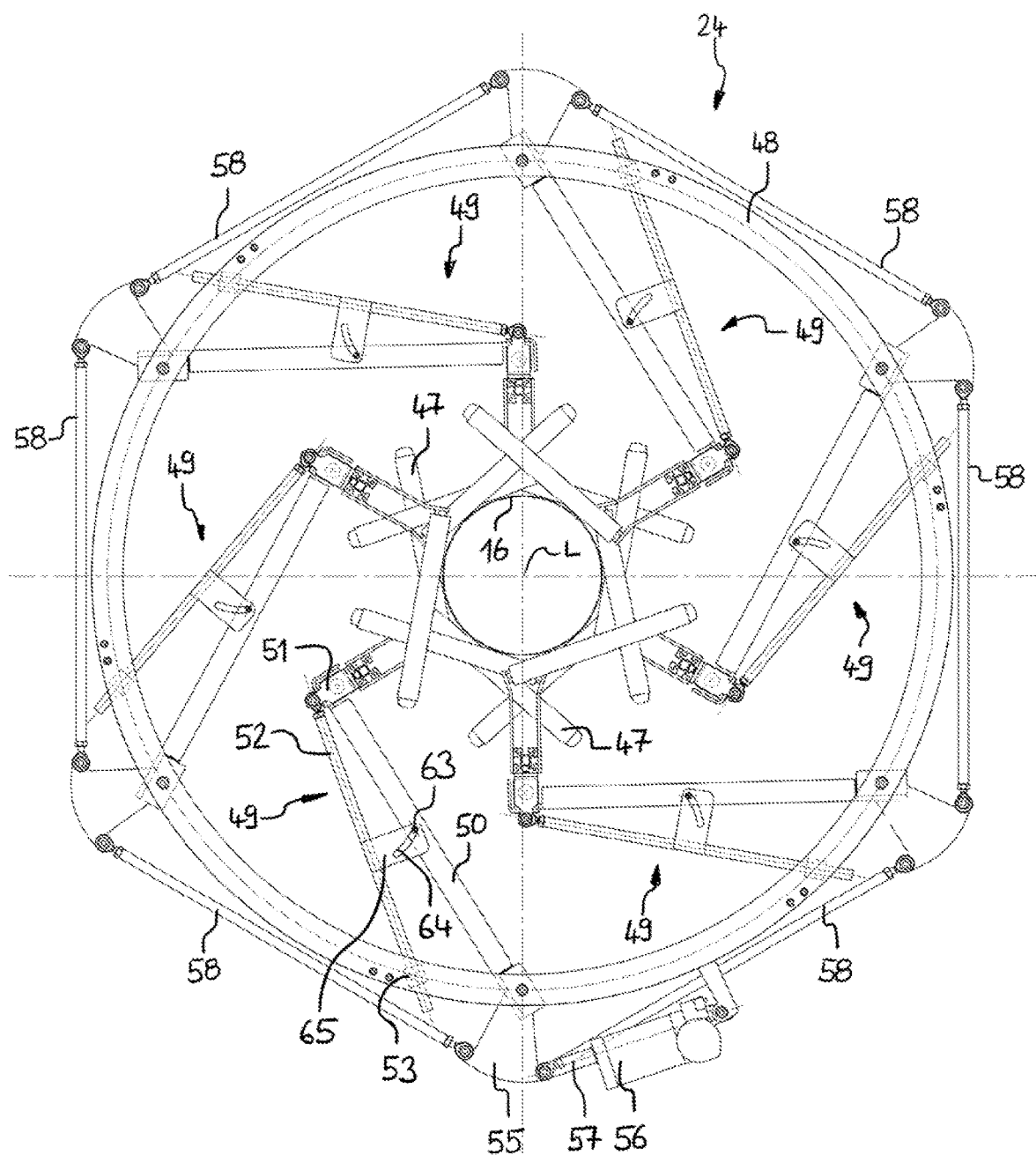
FIG. 9 is a top view of a sixth embodiment of a calibration and guidance device.

In contrast to the third embodiment, the guide 64 or plate 65 is attached to the pivot arm 50 rather than the frame 48. The plate 65 protrudes on the side of the pivot arm 50 facing the coupling rod 52. The cam follower 63, which is attached to the coupling rod 52, is slidable along the guide 64. Again, the arrangement may be reversed, i.e. the cam follower 63 may also be arranged on the pivot arm 50 and the guide 64 or plate 65 may be connected to the coupling rod 52, as shown in FIG. 9 according to a sixth embodiment.

Figure 10:
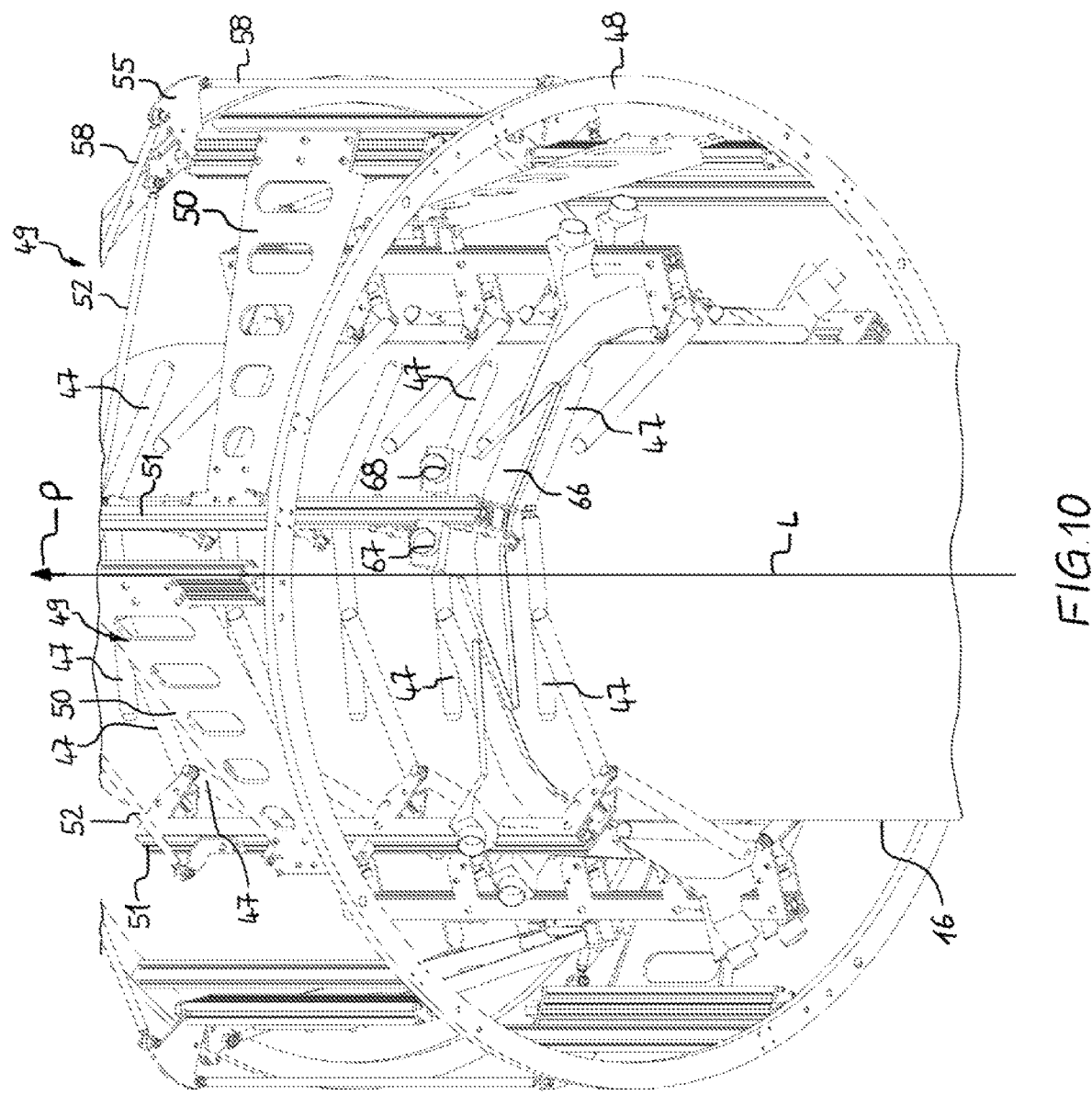
FIG. 10 is a perspective view of the calibration and guiding device according to the first embodiment in production direction obliquely from below.

FIG. 10 shows a perspective view according to the first embodiment of the calibration and guiding device in production direction P obliquely from below. Here, a cooling gas exhaust element 66 is attached to each carrier 51 of the adjusting units 49. The cooling gas exhaust elements 66 each have two exhaust ports 67, 68 that can be connected to exhaust lines not shown here. In the embodiment shown, the cooling gas exhaust elements 66 are in the form of sheet metal housing structures, each of which has an opening on its underside for extracting cooling gas. On a side facing the film tube 16, the cooling gas exhaust elements 66 have a curved contour.

The cooling gas exhaust elements 66 are arranged between two lowermost pairs of film guide elements 47 in the form of rollers, so that all the film guide elements 47 above them come into contact with as small a proportion as possible of evaporations from the film tube 16.

The invention claimed is:

1. A device for guiding a film tube emerging from a film blowing head and drawn off in a production direction, comprising:
   a frame through which the film tube can be passed in the production direction (P), and
   a plurality of adjusting units distributed over the circumference for adjusting film guide elements transversely to the production direction (P), the adjusting units each having the following:
      a pivot arm, which is pivotally attached to the frame,
      a carrier for at least one of the film guide elements, the carrier being pivotally connected to the pivot arm,
      a coupling rod which is pivotably connected to the carrier, and
   an actuating mechanism that is arranged between the coupling rod and the frame and that connects the coupling rod of at least one first adjusting unit to the frame in an articulating manner.

2. The device according to claim 1,
   wherein the at least one first adjusting unit forms a linkage or a cam gear.

3. The device according to claim 1,
   wherein the actuating mechanism is coupled in an articulating manner to the pivot arm of the at least one first adjusting unit, to the coupling rod of the at least one first adjusting unit and to the frame.

4. The device according to claim 1,
wherein the actuating mechanism has a coupling element which is connected in an articulating manner to the coupling rod of the at least one first adjusting unit and to the frame.

5. The device according to claim 4,
wherein the coupling element is pivotably connected to the coupling rod of the at least one first adjusting unit.

6. The device according to claim 4,
wherein the actuating mechanism has a connecting lever connected pivotably to the pivot arm and to the coupling element of the at least one first adjusting unit.

7. The device according to claim 4,
wherein the coupling element is connected slidably to the coupling rod of the at least one first adjusting unit and pivotably to the frame.

8. The device according to claim 7,
wherein the actuating mechanism has a cam guide mechanism with a guide and a cam follower, the coupling rod being coupled to the frame or the pivot arm via the cam guide mechanism, and the cam follower being guided such that it can be moved translationally along the guide.

9. The device according to claim 8,
wherein the cam follower is arranged on one element of the group comprising the coupling rod and the frame and the guide is arranged on the other element of the group comprising the coupling rod and the frame.

10. The device according to claim 8,
wherein the cam follower is arranged on one element of the group comprising the coupling rod and the pivot arm and the guide is arranged on the other element of the group comprising the coupling rod and the pivot arm.

11. The device according to claim 1,
wherein the device further has a synchronization mechanism via which the adjusting units are coupled to one another in order to synchronize the adjustment movements.

12. The device according to claim 11,
wherein the synchronization mechanism has push rods via which the adjusting units are coupled to one another circumferentially over the circumference of the device.

13. The device according to claim 11,
wherein at least one second adjusting unit of the plurality of adjusting units has a coupling element that is connected in an articulating manner, on the one hand, to the coupling rod of the at least one second adjusting unit and, on the other hand, to the frame and, moreover, is free from direct coupling to the respective pivot arm, and
wherein the synchronization mechanism has push rods via which the coupling elements of the first adjusting units and of the second adjusting units are coupled to one another circumferentially over the circumference of the device.

14. The device according to claim 1,
wherein the carriers each have two film guide elements spaced apart from one another in the production direction and are arranged so as to overlap in a V-shape.

15. The device according to claim 1,
wherein the device further comprises cooling gas exhaust elements arranged on the adjusting units.

16. The device according to claim 15,
wherein the cooling gas exhaust elements are arranged upstream of or between the film guide elements in the production direction (P).

* * * * *